United States Patent [19]

Thackray

[11] 4,175,768
[45] Nov. 27, 1979

[54] COLLAPSIBLE TRAILERS

[75] Inventor: Ronald A. Thackray, Great Baddow, England

[73] Assignee: Stow-A-Way Trailers Limited, Essex, England

[21] Appl. No.: 879,603

[22] Filed: Feb. 21, 1978

[30] Foreign Application Priority Data

Feb. 23, 1977 [GB] United Kingdom ................ 7655/77

[51] Int. Cl.² ........................................... B62B 11/00
[52] U.S. Cl. .................................. 280/652; 280/656; 280/491 A
[58] Field of Search .................. 280/652, 656, 491 A, 280/152 R, 154.5 R

[56] References Cited

U.S. PATENT DOCUMENTS

Re. 24,339  7/1957  La Pere ........................ 280/154.5 R
2,876,036   3/1959  Olson ............................. 280/491 A

FOREIGN PATENT DOCUMENTS 1361874  7/1974  United Kingdom ..................... 280/656

Primary Examiner—Robert R. Song

Attorney, Agent, or Firm—Larson, Taylor & Hinds

[57] ABSTRACT

A collapsible road trailer comprising a central beam to which side members of the base are hinged has a tow bar which forms a sliding fit within the central beam and is locked in position by members operated by the folding down of the sides of the base. The locking members are preferably in the form of lugs engaging openings in opposite sides of the tow bar and may be fixed rigidly to the sides of the base, passing through openings in the sides of the central beam and into the openings in the tow bar when in the engaged position. Detachable wheel assemblies may have separate mudguards which are held in position by the fixing of the wheel assemblies for which purpose each mudguard may have a stay bar which is trapped between a projecting portion of the respective wheel assembly and the side of the trailer. In addition each stay bar may be provided with a pair of locating lugs which fit on either side of an upward projection on the respective wheel assembly and thus locate the mudguard in a fore-and-aft direction. Each wheel assembly is preferably held in position within an inverted channel on the underside of the base by means of a toggle clamp.

5 Claims, 5 Drawing Figures

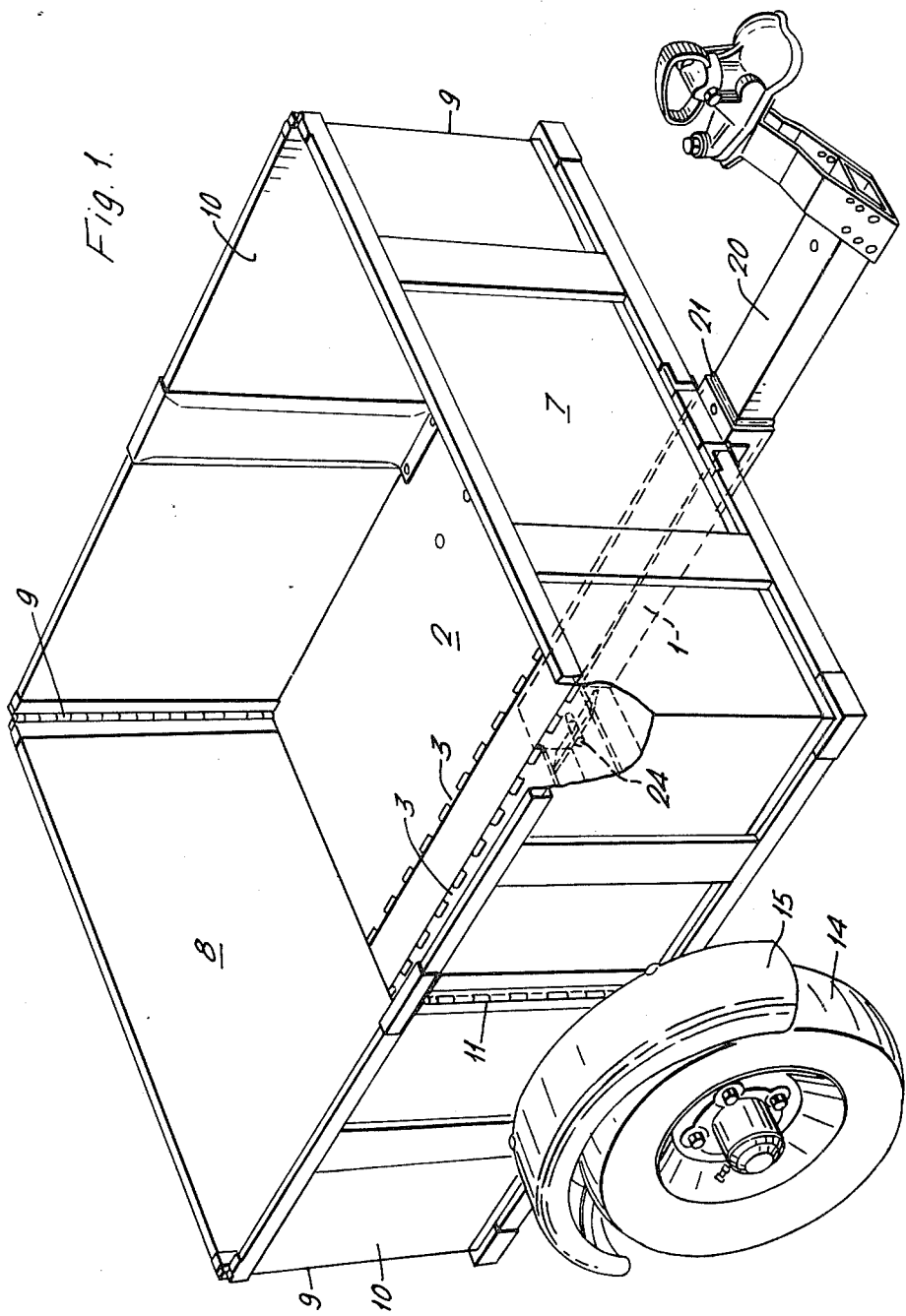

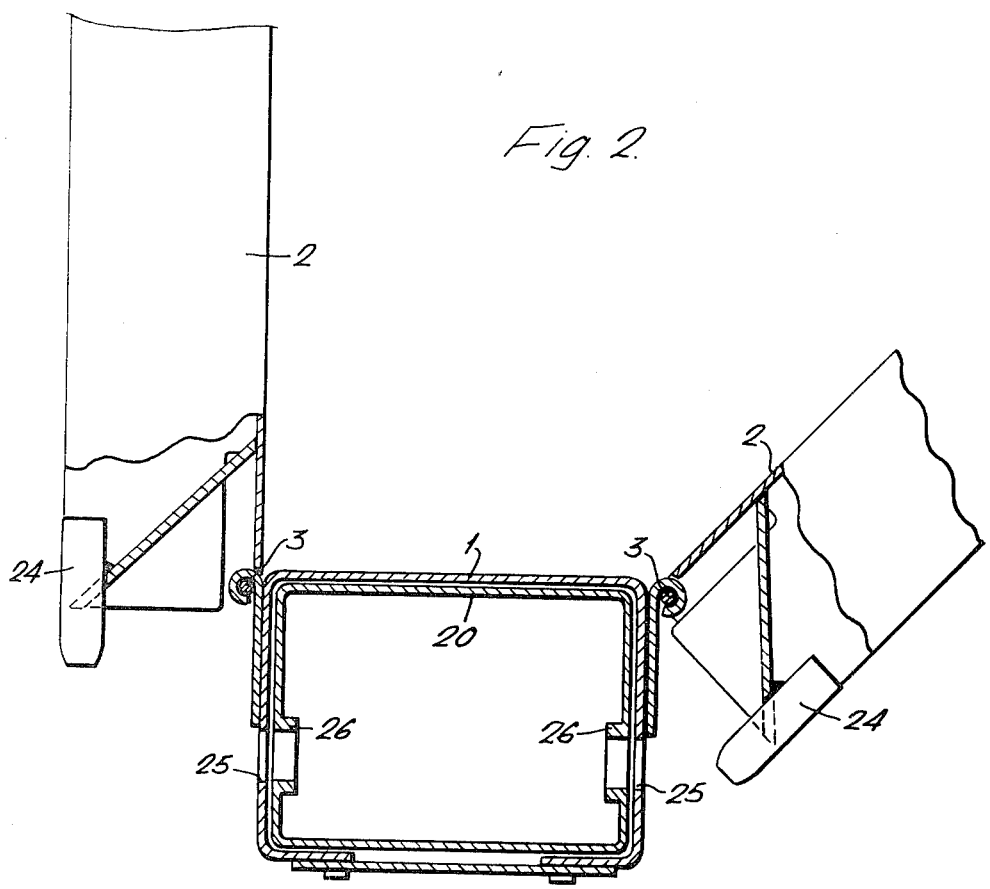

U.S. Patent  Nov. 27, 1979  Sheet 3 of 3  4,175,768
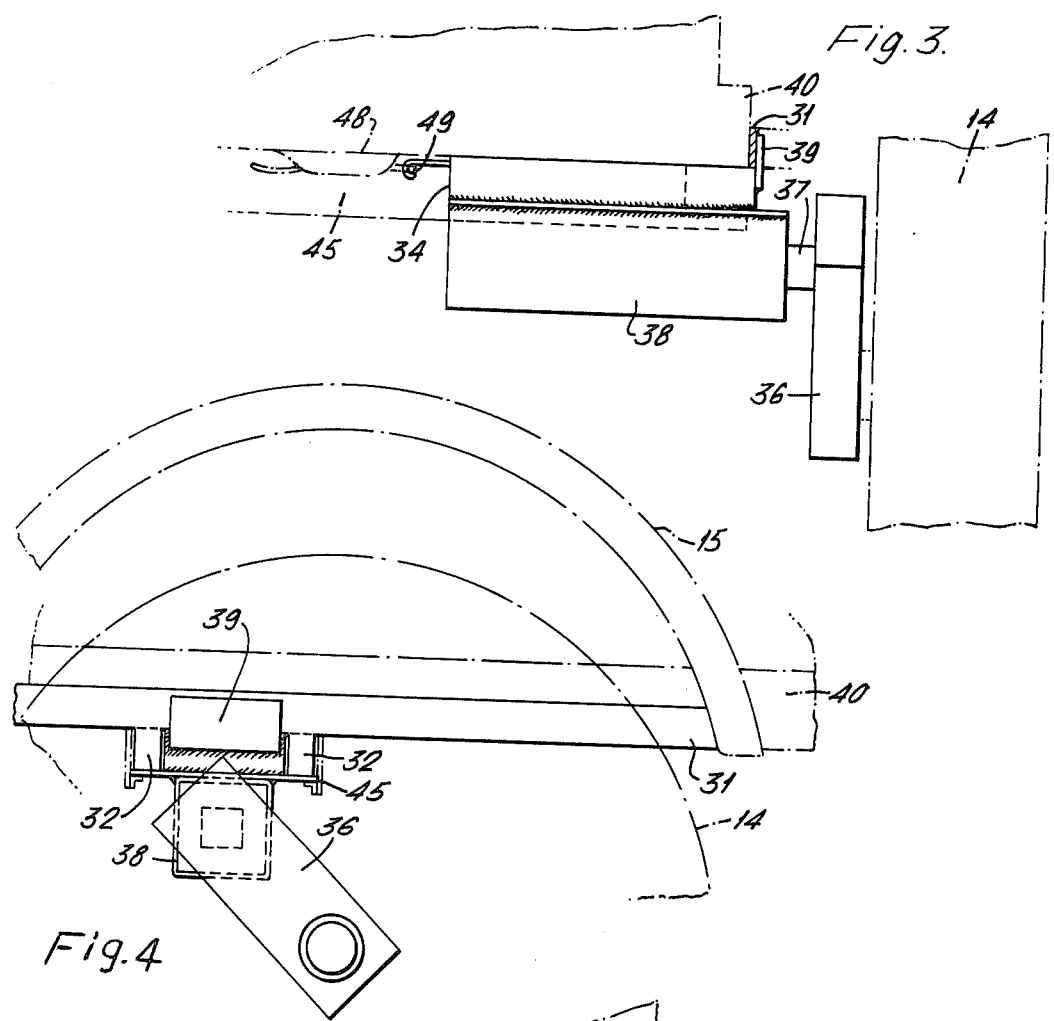
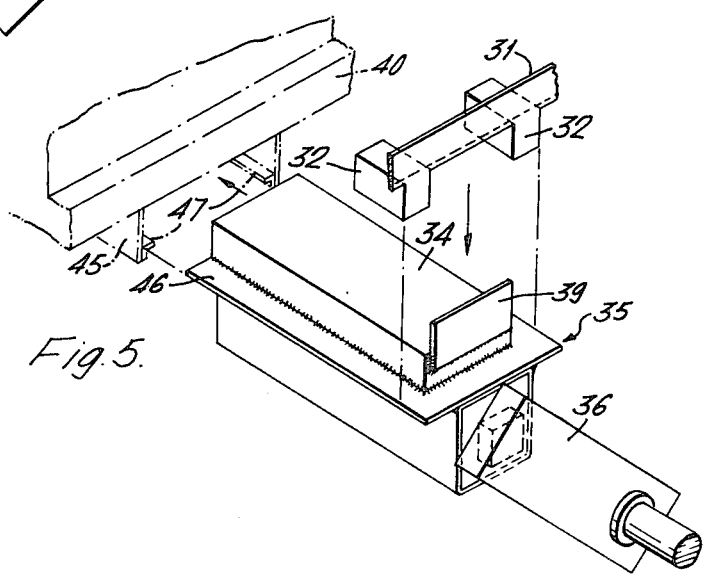

001
COLLAPSIBLE TRAILERS

BACKGROUND OF THE INVENTION

This invention relates to collapsible road trailers intended for use with private cars.

Prior Art

My prior British Pat. No. 1,361,874 describes a construction of trailer which can be collapsed into a very small space and which is extremely simple to assemble and collapse. The described construction comprises a central beam, supporting a base comprising separate side members hinged to the beam so as to be capable of folding upwardly in the collapsed position and a collapsible wall structure removably secured to the base. A forward extension of the main beam constitutes a tow bar. It is an object of the present invention to make the collapsed assembly even more compact and to make the assembly and collapsing even simpler.

SUMMARY OF THE INVENTION

According to the present invention, the tow bar is separate and forms a sliding fit within the central beam, being locked in position by members operated by the folding down of the sides of the base, being released when the sides are folded up again. By making the tow bar separate from the main beams, the collapsed assembly can be made considerably shorter and by locking the tow bar in position by the action of folding down the sides of the base, the assembly is rendered both simple and foolproof.

The members are preferably in the form of lugs engaging openings in opposite sides of the tow bar, under the control of the folding sides of the base. These lugs are most simply fixed rigidly to the sides of the base so that when the latter are folded down, the lugs pass through openings in the sides of the central beam and then into the openings in the tow bar. In order to ensure that the holes in the tow bar are brought correctly into register with the lugs the tow bar may be formed with a projection which engages with a surface at the open end of the central beam.

Accordingly, during assembly, the tow bar is merely slid into the main beam until the projection engages the surface and this brings the openings in the tow bar into register with the corresponding openings in the main beam. The two sides of the base are then folded downwardly and the lugs which are situated at the bottom of each side of the base, i.e., at a spacing from the hinge line, travel through an arc of a circle and enter the registering openings so as to lock the tow bar firmly in position. As a consequence, no separate locking action is necessary and it is thus impossible to fail to lock the tow bar in position. Moreover, the removal of the tow bar from the main beam when the trailer is being collapsed reduces the overall length of the assembly by an amount equal to that of the projecting portion of the tow bar.

The assembly may be still further simplified by means of modification to the wheel assemblies. As described in the previous specification, each wheel assembly includes a mudguard as an integral part and is supported from a flat mounting plate which has to be bolted in position within an inverted channel beneath each side of the base. According to the modification of the present invention, each mudguard is separate from the associated wheel of the assembly and is held in position by the fixing of the wheel assembly. By making the mudguard and the wheel assembly separate from one another, this reduces the size of each component and facilitates packing without the need for any additional fixing devices.

Each wheel assembly is preferably held in position within the inverted channel by means of a toggle clamp, thus completely avoiding the need for nuts and bolts since it is merely a question of inserting the wheel assembly in the inverted channel, engaging the clamp and then operating the toggle of the clamp to hold the assembly in position. In order to hold each mudguard in position by the fixing of the wheel assembly, a stay bar forming part of the respective mudguard may be trapped between a projecting portion of the respective wheel assembly and the side of the trailer. In addition, each stay bar may be provided with a pair of locating lugs which fit on either side of an upward projection on the respective wheel assembly and thus locate the mudguard in a fore-and-aft direction.

An example of a construction in accordance with the invention will now be described in more detail with reference to the accompanying drawings, in which:

FIG. 1 is a perspective view of the complete trailer with part of a corner broken away to show details of an arrangement for fixing a tow bar;

FIG. 2 is a sectional view to an enlarged scale of the fixing arrangement;

FIG. 3 is an end view showing part of a wheel assembly and mudguard fixed to the body of the trailer;

FIG. 4 is a side view corresponding to FIG. 3; and

FIG. 5 is an exploded perspective view of the parts shown in FIGS. 3 and 4 and illustrating the method of assembly.

The collapsible road trailer seen in FIG. 1 has a main structure which is essentially the same as that described in specification no: 1,361,874 so that only brief reference need be made to the main parts. These parts comprise a central main beam 1 supporting a base formed by two side portions 2 each hinged to the beam 1 at 3 so as to be capable of folding upwardly. The base has a surrounding wall structure of which the front and back 7 and 8 respectively are rigid and are hinged at their ends at 9 to folding sides 10, each of which has a line of hinges 11 along its centre line, only one of which can be seen in FIG. 1. The parts 7, 8 and 10 are fixed to the base 2 as described in the earlier specification and when released can be folded into a compact unit by bringing the two lines of hinges 11 together, thus causing the two sides 10 to be folded between the front 7 and the back 8 to form a compact unit capable of fitting into the space between the folded-up sides of the base. The trailer also has a pair of wheels 14 provided with mudguards 15.

As so far described, the construction is identical with that of specification no: 1,361,874. In the construction of the earlier specification, however, the beam 1 extends forwardly to constitute a tow bar. In the modified construction according to the present invention, the tow bar 20 is a separate component which forms a sliding fit within the central beam 1. FIG. 1 shows the tow bar in it operative position in which it will be seen that a ridge 21 extending around all four sides of the tow bar 20 constitutes a projection which engages a surface at the open end of the beam 1 and thus provides correct longitudinal positioning of the tow bar. The tow bar is locked in this position by an arrangement which is visible in FIG. 1 as a result of the breaking away of the nearest corner, but of which the details are illustrated more clearly in FIG. 2.

FIG. 2 shows the beam 1 in section with the tow bar 20 within it. The sides 2 of the base are both broken away, that on the left being shown in a vertical position and that on the right in a position approximately at forty five degrees to the vertical. Each side 2 is fitted with a rigid lug 24 and when each side is folded down to the horizontal position illustrated in FIG. 1, each lug passes firstly through an opening 25 in the beam 1 and then into an opening 26 in the tow bar 20, these openings being brought into registration with one another by abutment of the projection 21 with the surface at the end of the beam 1. The entry of the lugs 24 into the openings 25 and 26 firmly locks the tow bar 20 to the main beam 1, thus enabling the towing force to be transmitted to the trailer as a whole. When the trailer is to be dismantled, however, upward folding movement of the sides 2 of the base frees the tow bar 20, allowing it to be withdrawn from the beam 1, thus reducing the overall length of the assembly by an amount equal to that of the projecting portion of the tow bar 20. It will be understood that it is impossible to fail to lock the tow bar in position since unless the openings 25 and 26 are in register with one another, the sides 2 of the base cannot be folded down into the horizontal position, but provided the openings 25 and 26 are in register, the locking is then automatic.

The second modification to the construction of the earlier specification is illustrated in FIGS. 3, 4 and 5. In this construction, each mudguard 15 is seen in dotted lines in FIG. 4, has a stay bar 31 by means of which the mudguard 15 is held in position when the wheel assembly is fixed. For this purpose the stay bar 31 is provided with a pair of locating lugs 32 which lie below the stay bar and, as best seen from FIG. 5, extend inwardly towards the body of the trailer. These lugs fit on either side of an upwardly projecting portion 34 of the wheel assembly which is indicated generally as 35. A wheel 14 is shown in dotted lines in FIGS. 3 and 4, but not in FIG. 5. Each wheel 14 is mounted on the end of an arm 36 fixed to the end of a torque bar 37 seen in FIG. 3 and enclosed within a casing 38 from the top of which the portion 34 projects upwardly.

At its outer end, the part 34 is fitted with a rectangular plate 39 between which and the side of the trailer at 40 the stay bar 31 is trapped when the wheel assembly 35 is fixed in position.

For this purpose, the part 34 is fitted into an inverted channel defined by a cross beam 45, not shown in FIG. 1. Flanges 46 on the wheel asembly engage corresponding flanges 47 on the inside of the inverted channel, thus enabling the wheel assembly to be slid into position until further movement is prevented by engagement of the plate 39 with the stay bar 31 which is thus trapped against the side 40 of the trailer, this position being illustrated in FIG. 3. The assembly 35 is then held in this position by a toggle clamp 48 located within the inverted channel 45 and which engages with a hook 49 on the wheel assembly 35. Consequently, the only action necessary to fix both the wheel assembly and the associated mudguard in position is to engage the clamp 48 with the hook 49 and then to move it to the locked position. This pulls the wheel assembly firmly inwardly and grips the stay bar 31 between the side 40 of the trailer and the plate 39.

When the assembly is being collapsed, the reverse occurs and release of the toggle clamp 48 enables the wheel unit to be withdrawn from the inverted channel 45, thus automatically freeing the stay bar 31 and hence the mudguard 15 which can then be merely lifted out of position. All the fixing operations so far described can be carried out in a short space of time and practical experience shows that the complete trailer can be unfolded and assembled in less than two minutes.

I claim:

1. In a collapsible road trailer comprising a central main beam, a base comprising separate side members and means hingeing said side members to said main beam, a collapsible wall structure, means for removably securing said wall structure to said base, two wheel assemblies and means for removalby securing said wheel assemblies to said base, the improvement comprising said main beam being hollow, a tow bar telescoped within said main beam and means locking said tow bar at a predetermined position within said main beam, said locking means being operated by the hingeing down of said side members of said base.

2. A collapsible road trailer according to claim 1 wherein said side members and said main beam are formed with registering openings and said locking means comprise lugs engaging said openings.

3. A collapsible road trailer according to claim 2 wherein said lugs are fixed rigidly to said members whereby to be inserted through said registering openings when said side members are hinged downwardly.

4. A collapsible road trailer according to claim 1 wherein said tow bar comprises an encircling projection for engagement with a surface at the open end of said central beam whereby to ensure location of said tow bar at said predetermined position.

5. A collapsible road trailer comprising a central main beam, a base comprising separate side members and means hingeing said side members to said main beam, a collapsible wall structure, means for removably securing said wall structure to said base, a transversely extending inverted channel secured to the underside of the said base, said inverted channel having open ends, two wheel asemblies, each said wheel assembly fitting into a respective open end of said inverted channel, each said wheel assembly including a projecting portion limiting insertion of said wheel assembly into said inverted channel, and toggle clamps within said inverted channel for drawing the respective wheel assemblies into said inverted channel until limited by the respective said projecting portion, whereby to removably secure said wheel assemblies to said base.

* * * * *